A. A. RUTTAN & C. E. HUTCHINGS.
LATCH MECHANISM FOR FOLDING CAMERAS.
APPLICATION FILED NOV. 24, 1916.
1,225,861.
Patented May 15, 1917.
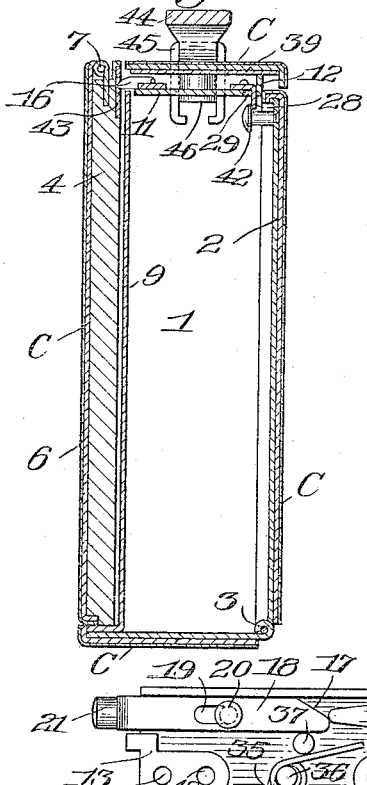
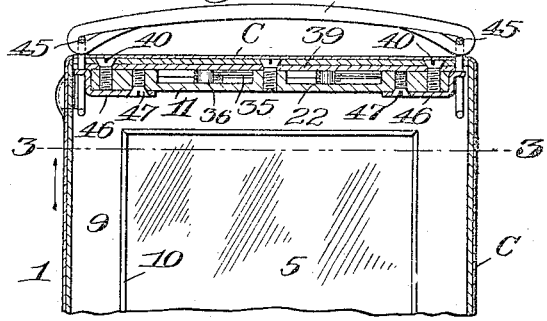
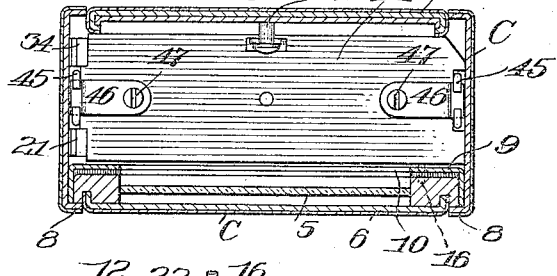
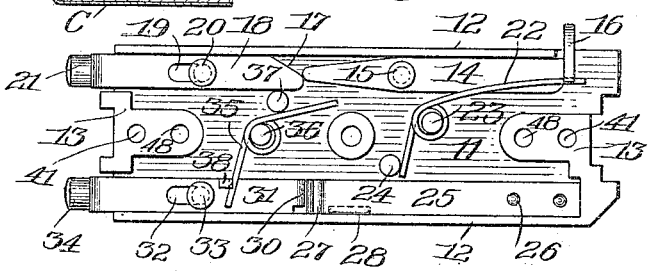
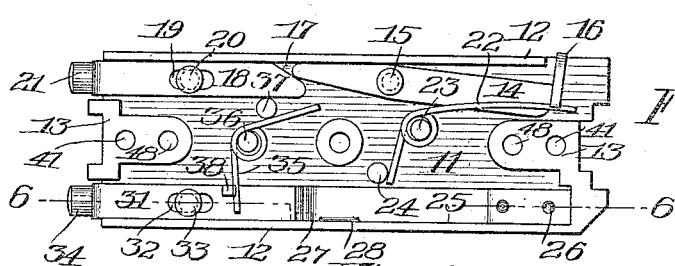
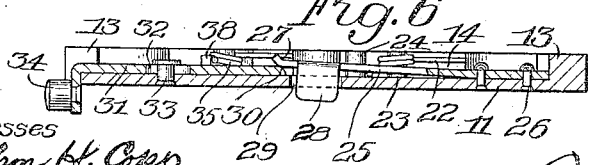
INVENTORS
Alfred A. Ruttan
Charles E. Hutchings
BY
their ATTORNEYS
Witnesses

UNITED STATES PATENT OFFICE.

ALFRED A. RUTTAN AND CHARLES E. HUTCHINGS, OF ROCHESTER, NEW YORK, ASSIGNORS TO EASTMAN KODAK COMPANY, OF ROCHESTER, NEW YORK, A CORPORATION OF NEW YORK.

LATCH MECHANISM FOR FOLDING CAMERAS.

1,225,861.          Specification of Letters Patent.       Patented May 15, 1917.

Application filed November 24, 1916. Serial No. 133,113.

*To all whom it may concern:*

Be it known that we, ALFRED A. RUTTAN and CHARLES E. HUTCHINGS, both of Rochester, in the county of Monroe and State of New York, have invented certain new and useful Improvements in Latch Mechanism for Folding Cameras; and we do hereby declare the following to be a full, clear, and exact description of the same, reference being had to the accompanying drawings, forming a part of this specification, and to the reference-numerals marked thereon.

Our present invention relates to photography and more particularly to photographic cameras of the folding type in which displaceable members are employed at both the front and back of the camera body, and the invention has for its object to provide a simple, cheap and efficient latch mechanism for both of said displaceable members, which latch mechanism can be readily assembled and applied as a unit to the camera body. A further object of the invention is to utilize this latch mechanism in fastening the carrying strap or handle of the camera to the camera body and to these and other ends the invention consists in certain improvements and combinations of parts, all as will be hereinafter more fully described, the novel features being pointed out in the claims at the end of the specification.

In the drawings:

Figure 1 is a central vertical section through a camera body provided with a latch mechanism constructed in accordance with and illustrating one embodiment of our invention;

Fig. 2 is a transverse vertical section through the upper portion of the camera and latch mechanism;

Fig. 3 is a horizontal section taken substantially on the line 3—3 of Fig. 2;

Fig. 4 is an enlarged plan view of the latch mechanism detached, with the latches in normal position;

Fig. 5 is a similar view with the latches in released position, and

Fig. 6 is a sectional view taken substantially on the line 6—6 of Fig. 5.

Similar reference numerals in the several figures indicate the same parts.

We have illustrated in the drawings the casing of the camera only with the lens bellows and other parts removed as the present invention is independent of both their structure and disposition. Referring first to Figs. 1, 2 and 3, in all of which C indicates merely the leather or similar covering on the exterior surfaces of the parts to give the desired finish to the camera, 1 indicates the body of the camera, which is merely a four-sided frame open at the front and rear. The front is closed by the usual swinging bed plate 2 hinged at 3 and which acts as a bed for focusing the camera when extended and as a door or cover when the camera is folded. At the rear the body is closed by a back member 4 that may be either a focusing frame, film pack adapter or plate holder. In the present instance, a focusing screen or back is shown comprising a frame having a ground glass 5 therein and an opaque cover 6 on its rear side hinged at 7 to obtain a view of the glass when desired. The back or screen is removable and is slidably inserted in or withdrawn from a pocket at the rear of the camera formed between inturned flanges 8 on the body and an inner frame 9 having the usual exposure opening 10 therein.

The latch mechanism is carried wholly by a plate 11, which we prefer to form as a die casting having flanges 12 at each side and bosses 13 at the ends. Along one flange 12 of the plate is disposed a lever 14 pivoted at 15. At one end of this lever is a catch 16 projecting beyond the flange 12, while the other end is rounded and adapted to be engaged by the cam face 17 of a sliding plate 18 slotted at 19 and mounted on a headed guide pin 20 that coöperates with the flange 12 to guide the plate longitudinally. The plate terminates at the other end in a push button 21, and when this button is pressed it retracts the catch 16, as shown in Fig. 5, against the tension of a spring 22 coiled about a stud 23 on the plate 11 and engaging the lever 14 at one end and the stop 24 on the plate at the other.

At the other side of the plate paralleling the flange 12 is a spring arm 25 riveted thereto at one end, as indicated at 26 and having an upwardly inclined cam surface 27 at its free end. Adjacent to this cam surface is an ear 28 on the arm forming a catch that projects downwardly through an aperture 29 in the plate 11. The cam surface 27 is adapted to be engaged by and to ride upwardly upon the cam face 30 at the end of a sliding plate 31 slotted at 32 to reciprocate upon a headed guide pin 33 and the flange 12. The plate 31 terminates in a push button 34 and when this is pressed inwardly against the tension of a spring 35 the spring finger 25 is raised and the catch 28 thereon retracted. The spring 35 is coiled about a stud 36 on the plate 11 with one end acting against a stop 37 and the other end acting against a projection 38 on the plate 31. It will be noted that in either case the tendency of the coiled spring is to return the push button.

The plate 11 and all of the latch mechanism can first be assembled as a unit and the plate is then applied to the inner face of the top wall 39 of the camera body by screws 40 extending through said wall and into apertures 41 in the bosses 13. The plate is substantially coincident with the wall extending from front to rear of the body and at the front it acts as a stop for the door or bed 2 when closed. A headed stud 42 at the upper or front edge of the door 2 is engaged by the catch 28 of the spring latch 25 in the manner shown in Fig. 1, and to release the door the latch is released by means of the push button 34 that, together with the push button 21, projects through the side wall of the camera body 1, as shown in dotted lines in Fig. 2 though concealed beneath the leather covering C, which is sufficiently pliable to permit its actuation therethrough, as usual. The catch 16 on the other latch arm 14 normally projects outwardly or rearwardly beyond the plate 9 to coöperate with a keeper plate 43 on the back member 4. The catch is rounded, as shown in Fig. 1 to permit it to be displaced as the back member is slid into position, and when the latter is in position it automatically springs into engagement. It is released to permit the withdrawal of the back member through the medium of the push button 21 in the manner described.

The studs 23 and 36 around which the springs 22 and 35 are coiled are not headed so that the springs can be easily applied in assembling, but when the plate is applied to the camera wall these studs abut the latter and prevent the springs from coming off.

We also utilize the latch plate 11 for connecting the usual carrying strap 44 of the camera to the camera body. The ends of the strap embrace links 45 that extend through suitable openings in the camera wall to the interior of the body.

The interior ends of the links straddle projections 46 at the ends of the plate 11, which, in the present instance, are formed separately and secured to the plate by screws 47 threaded into openings 48, permitting the carrying strap to be applied after the plate is in place. Otherwise these projections could be made integral and the strap assembled with the plate. Except when the camera is being supported by the strap 44 the links 45 drop down into the camera body, as shown in the figures, allowing the straps to lie flat against the exterior.

We claim as our invention:

1. In a folding camera, the combination with a camera body having a door at the front and a removable back member, of a plate secured on the inner face of one of the side walls of the body to extend from front to rear of the latter, and two latches carried wholly by the plate to coöperate respectively with the door and back member.

2. In a folding camera, the combination with a camera body having a door at the front and a removable back member, of a plate secured on the inner face of one of the side walls of the body to extend from front to rear of the latter, and two latches carried wholly by the plate to coöperate respectively with the door and back member, said latches embodying spring arms having catches thereon and sliding cam plates coöperating with the arms and terminating in push buttons projecting through an adjacent wall of the camera body.

3. In a folding camera, the combination with a camera body having a door at the front and a removable back member, of a plate secured on the inner face of one of the side walls of the body, two latches carried wholly by the plate to coöperate respectively with the door and back member, studs on the plate abutting the said wall and springs for the latch mechanisms coiled about the studs and held thereon by the camera wall.

4. In a folding camera, the combination with a camera body having a door at the front, of a plate secured on the inner face of one of the side walls of the body, a latch carried wholly by the plate to coöperate with the door, links extending through the said wall of the body, a handle on the outside of the latter secured to the links and projections on the plate interlocking with the links on the inside of the body.

ALFRED A. RUTTAN.
CHARLES E. HUTCHINGS.

Witnesses:
LINDA SCHWING,
HELEN M. FRASER.